United States Patent [19]

Latarius

[11] Patent Number: 4,566,628
[45] Date of Patent: Jan. 28, 1986

[54] METHOD OF AND SYSTEM FOR CONTROLLING THE RATIO BETWEEN THE WATER FLOW RATE IN THE PRIMARY CIRCUIT AND THE WATER FLOW RATE IN THE SECONDARY CIRCUIT OF A HOT WATER HEATING SYSTEM

[75] Inventor: Hans R. Latarius, Essen, Fed. Rep. of Germany

[73] Assignee: Tekmar Angewandte Elektronik GmbH & Co. KG, Fed. Rep. of Germany

[21] Appl. No.: 585,897

[22] Filed: Mar. 2, 1984

[51] Int. Cl.$^4$ .......................... F24D 3/00; E03B 7/07
[52] U.S. Cl. .................................... 237/8 C; 237/19; 137/563; 137/597; 137/630.2
[58] Field of Search ............ 137/563, 597, 876, 630.2, 137/630.22; 237/8 C, 8 R, 56

[56] References Cited

FOREIGN PATENT DOCUMENTS 1954962 10/1969 Fed. Rep. of Germany ...... 237/8 C
2621904  1/1978 Fed. Rep. of Germany ...... 237/8 C Primary Examiner—Henry Bennett
Attorney, Agent, or Firm—Spensley Horn Jubas & Lubitz

[57] ABSTRACT

A method of controlling the ratio between the water flow rates in the primary and secondary circuits of hot water heating systems, particularly of low-temperature hot water heating systems, by mixing flow water with return water passing through an adjustable bypass by means of a multi-way mixing device. To make maximum use of the rangeability of said mixing device and to optimize overall heating system control, the bypass water flow rate is controlled as a function of the mixing device position and the bypass is substantially closed when the way from the primary circuit flow piping to the secondary circuit flow piping is fully opened and/or an appropriate signal is given by the heating system controller.

21 Claims, 11 Drawing Figures

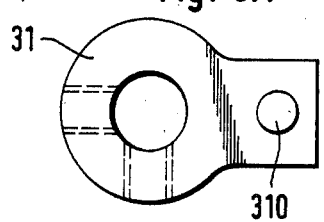
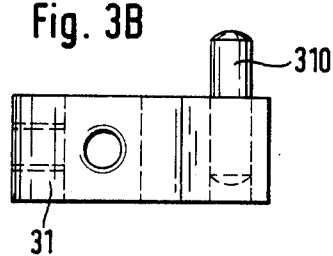
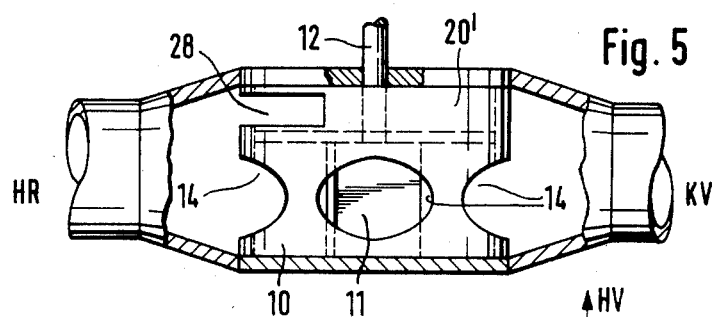
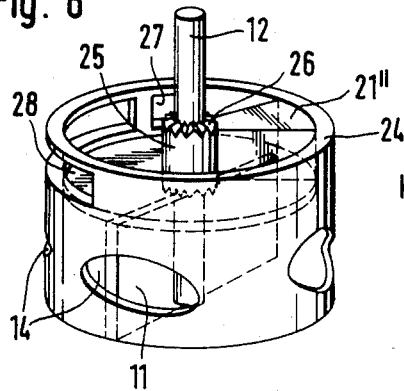
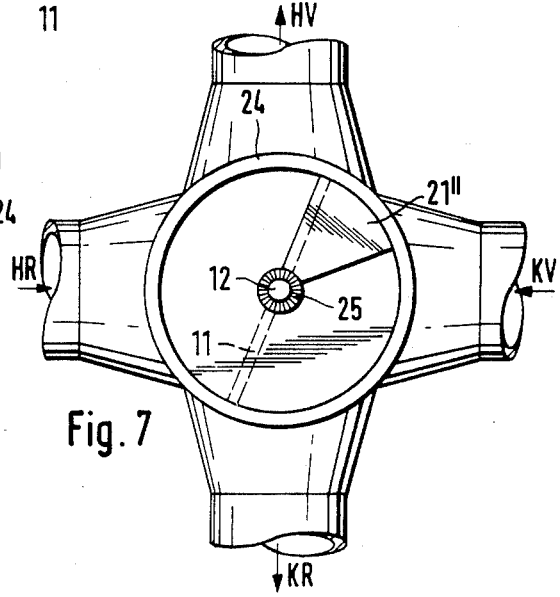
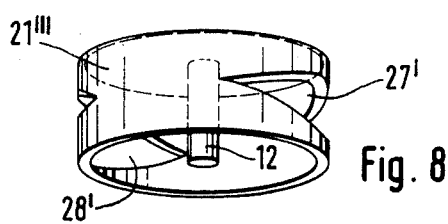

METHOD OF AND SYSTEM FOR CONTROLLING THE RATIO BETWEEN THE WATER FLOW RATE IN THE PRIMARY CIRCUIT AND THE WATER FLOW RATE IN THE SECONDARY CIRCUIT OF A HOT WATER HEATING SYSTEM

BACKGROUND OF THE INVENTION

The present invention relates to a method of and a system for controlling the ratio between the water flow rate in the primary circuit and the water flow rate in the secondary circuit of a hot water heating system, such as, without limitation, a low-temperature heating system, providing for return water passing through an adjustable bypass to be mixed with flow water passing through a multi-way mixing device.

If conventional devices not incorporating a bypass are used for controlling the ratio between the primary and secondary circuit flow rates in a low-temperature heating system, such as, without limitation, an underfloor heating system, the maximum flow temperature of 50° C. is already obtained when the mixing device is in a mid-range position, assuming an average boiler water temperature of 80° C., thereby losing the benefit of some 50% of the mixing device control range and accepting inaccurate and hence unsatisfactory control characteristics.

If a preset bypass is incorporated, substantially the entire rangeability of the mixing device is exploited, thereby achieving reasonably accurate control characteristics. Known methods of and systems for so obtaining reasonably accurate control characteristics provide for the bypass butterfly valve to be set to an appropriate position prior to the use of the heating system, thereby fixing said position for the entire mixing device control range. The additional quantity of return water fed into the flow piping is sufficient for the maximum flow water temperature not to be exceeded, if and when the way from the primary circuit through the mixing device to the secondary circuit is fully opened.

Said known method of and equipment for controlling the ratio between the water flow rates in the primary and secondary circuits using a preset bypass are associated with a number of disadvantages encountered during the operation of the heating system. Flow control is, for example, very slow particularly as the flow temperature approaches the maximum flow temperature, since the additional quantity of return water mixed with the flow water through the bypass is comparatively large. Steady state conditions at maximum flow temperature or near maximum flow temperature are only reached after many hours or never reached. Said disadvantages of conventional control systems only allow a very slow increase in the heat supplied to the space heated during the heating-up period after the night-time temperature reduction even if modern heating system controllers allow a much more rapid heat input.

In the cases of variable heat output boiler plants and/or boilers no longer oversized for economic or financial considerations which no longer feature any extra capacity to increase the room temperature from a low level to a normal level under design temperature conditions, it is therefore no longer possible to incorporate a non-adjustable bypass between the flow and the return piping.

SUMMARY OF THE INVENTION

It is an object of the present invention to provide an improved method of and system for controlling the ratio between the water flow rate in the primary circuit and the water flow rate in the secondary circuit of a hot water heating system, such as, without limitation, a low-temperature hot water heating system, providing for return water flowing through an adjustable bypass to be fed into the secondary circuit flow water passing through a multi-way mixing device. According to this invention, said bypass is controlled as a function of the position of the mixing device control means and the bypass is substantially closed when the passage from the primary circuit flow piping to the secondary circuit flow piping is fully opened, thereby allowing, for example, during the heating-up phase following the usual night-time temperature reduction additional heat to pass into the flow system to increase the flow water temperature comparatively rapidly to the desired maximum flow temperature by fully opening the mixing device for a limited period of time and minimizing the quantity of return water being fed into the flow water. As said mixing device is gradually closed, as the set flow temperature is approached, said bypass is opened and the quantity of return water being fed into said flow water piping is increased, the flow water thereby retaining the maximum flow temperature in the upper range of the mixing device as desired for rapid temperature increase. The present invention hence allows the user to benefit from the entire mixing device control range for the normal control of the ratio between the water flow rates in the primary and secondary circuits for room temperature control during daytime operation hence improving the accuracy of the mixing device control. The present invention therefore combines the advantages of the control characteristics of multi-way mixing devices without bypass being the very limited lag and the comparatively short transient periods with regard to controlling the ratio between the water flow rates of the primary and secondary circuits and the advantages of known mixing device and bypass combinations, thus substantially benefitting from the complete mixing device control range and achieving accurate control characteristics.

It is hence an object of this invention to overcome problems associated with the control of the ratio between the water flow rates in the primary and secondary circuits of conventional hot water heating systems, said object including, without limitation, the exploitation of substantially the entire mixing device control range and achieving accurate control and still comparatively fast response. It is further an object of this invention to provide quickly the additional heat desired after night-time temperature reduction.

Further objects, features and associated advantages of the present invention become apparent from the detailed description and the drawings below.

BRIEF DESCRIPTION OF THE DRAWINGS

FIGS. 3A and 3B show a top view and a side view of a follower means according to another aspect of the present invention adjustably connected with the bypass butterfly valve shaft for moving said butterfly valve.

FIG. 5 is a schematic side view of a four-way mixing device embodying another aspect of the present invention providing for a bypass chamber arranged coaxially in relation to the mixing chamber of the mixing device.

FIG. 6 is an exploded schematic view of the mixing and bypass chambers and the control means arranged in said chambers for the synchronous control of the mixing device and the bypass.

FIG. 7 presents an axial view of the bypass and mixing chambers and the primary and secondary circuit openings.

FIG. 8 shows a pot-shaped circular slide valve for varying and adjusting the water flows passing through the bypass and/or the mixing chamber.

DETAILED DESCRIPTION OF THE DRAWINGS

Figure 1:
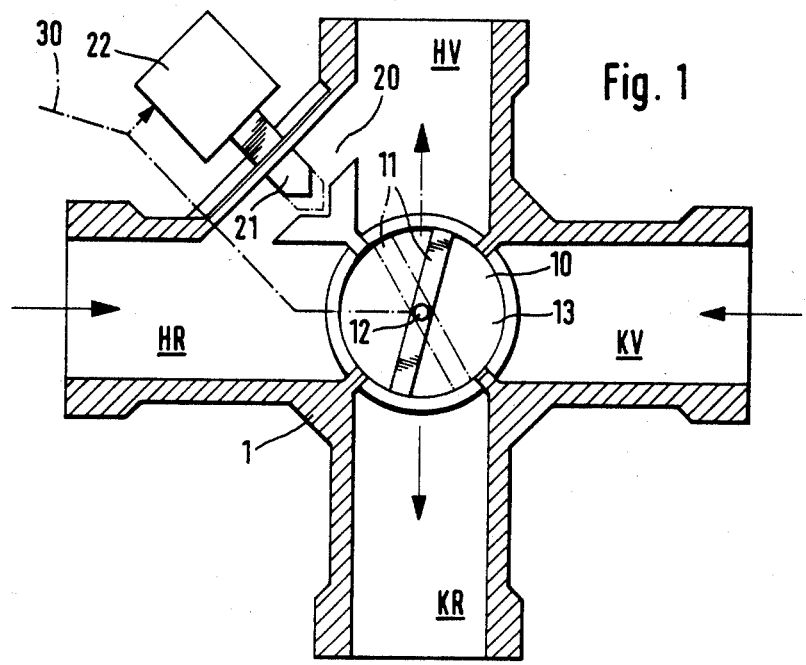
FIG. 1 is a schematic cross-section of the housing of a mixing device embodying the present invention wherein the adjustable bypass radially displaced from the mixing device chamber is fitted with a motorized or thermal actuator for the bypass control means.

FIG. 1 is a schematic of a typical embodiment of a mixing device incorporating a bypass as provided for by this invention on the basis of which the nature of this invention is disclosed hereinbelow.

The mixing device shown by FIG. 1 is a four-way mixing device with openings for the primary circuit flow piping KV, the primary circuit return piping KR, the secondary circuit flow piping HV and the secondary circuit return piping HR, the housing 1 of said mixing device containing the cylindrical mixing chamber 10 of said mixing device and a rotating butterfly valve 11 whose position determines the ratio between the primary circuit flow and the secondary circuit flow. If said butterfly valve 11 is in the diagonal position depicted by the unbroken line, said primary circuit and said secondary circuit are isolated from each other, and if the position of said butterfly valve 11 is rotated by an angle of 90°, the entire primary circuit flow water will enter the secondary circuit flow piping, while the secondary circuit return water will enter the primary circuit return piping. The position of said butterfly valve 11 is controlled by a drive shaft 12 by conventional methods using an actuator not depicted and controlled by the heating system control system.

Figure 2:
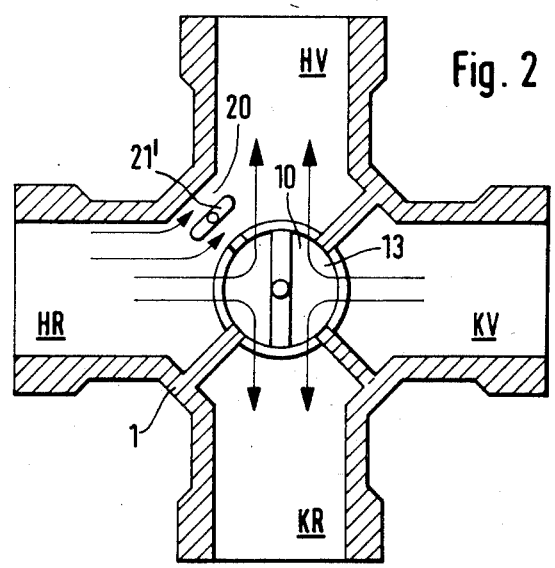
FIG. 2 is a schematic cross-section of the housing of a mixing device embodying the present invention fitted with a bypass butterfly valve moved by a shaft leaving said housing through the top.

In the case of the embodiment of the present invention shown by FIG. 1, an adjustable bypass 20 is arranged radially in housing 1 outside the mixing chamber 10, said adjustable bypass, bypassing the mixing chamber 10, connecting the secondary circuit flow piping HV and the secondary circuit return piping HR. The quantity of return water flowing from the secondary circuit return piping HR to the secondary circuit flow piping HV may be controlled by a bypass control means 21 which may be a slide valve closing the radial bypass passage as shown schematically for the embodiment of the invention represented by FIG. 1. In another embodiment of the invention shown schematically by FIG. 2, a swing-type butterfly valve 21' is incorporated in bypass 20, the position of the butterfly of said valve 21' determining the bypass cross-section through which secondary circuit return water will enter into the secondary circuit flow piping HV. The shaft of said bypass butterfly valve 21' leaves the housing 1 through the top and is preferably controlled by way of a follower means and an appropriate groove in accordance with a given control programme (FIGS. 3A, 3B, 4A, 4B and 4C).

The bypass control means 21 is actuated by an actuator 22 moving the obturator of said control means 21 between two limit positions, said limit positions representing substantially opened and substantially closed positions being preset. FIG. 1 depicts the substantially opened position of the obturator of control means 21 by an unbroken line and the substantially closed position of said obturator by a broken line.

The actuator 22 is controlled as a function of the position of shaft 12 or butterfly valve 11 connected with said shaft, said interaction being symbolized by the dot-dash line 30 in FIG. 1.

The actuator 22 and the butterfly valve 11 are so interconnected that said actuator 22 will substantially close the control means 21, moving said control means into the broken line position shown by FIG. 1, and minimize the unobturated bypass cross-section, when the passage from the primary circuit flow piping KV through the mixing chamber 10 to the secondary circuit flow piping HV is fully opened and the mixing chamber valve 11 is in the position depicted by broken lines in FIG. 1. When the valve 11 is in said position, the quantity of secondary circuit return water entering the secondary circuit flow piping HV through bypass 20 and mixing with the flow water passing through the mixing chamber 10 will be nil or very low depending on the setting of the closed limit position of the bypass control means 21, the temperature in the secondary circuit flow piping HV increasing substantially without time lag to the temperature level in the primary circuit flow piping KV, thus allowing a rapid increase in temperature after night-time temperature reduction and the operation of the space heating system, for example, in the event of high outdoor temperatures by employing a low-temperature source of heat, such as a heat pump or a solar energy system. If, on the other hand, the maximum flow temperature is exceeded, the butterfly valve 11 is rapidly returned to a different position, such as an intermediate position, allowing water from the primary circuit flow piping KV passing through the mixing chamber 10 and an increased quantity of secondary circuit return water passing through the cross-section of bypass 20 increased by opening the bypass control means 21 to mix at the secondary circuit flow water inlet HV.

The control of bypass control means 21 as a function of the position of the mixing device control means 11 hence combines the advantage of exploiting substantially the entire mixing device control range as in the case of conventional mixing devices fitted with preset bypasses and the advantage of fast response as in the case of conventional mixing devices without bypass and thence allows a rapid increase in the temperature of the secondary circuit flow water following night-time temperature reduction as well as the use of heat pumps or solar energy sources for operating hot water heating systems.

The bypass control means actuator 22 and the mixing device control means 11 may be interconnected in the case of the embodiment of the present invention depicted by FIG. 1 and in the cases of other embodiments by a variety of means, the most simple of such means both under design and fabrication aspects being the provision of a solenoid for actuator 22 being excited via an electric switch when valve 11 is substantially opened as depicted by the broken lines in FIG. 1 and thereby closing control means 21 to a preset limit position, such as the limit position depicted in FIG. 1 by a broken line, and thereby minimizing the unobturated cross-section of bypass 20. To eliminate any impact of the closed position or a substantially closed position of the bypass control means 21 on the performance of the pump used for circulating the hot water through the heating system, the resistance of the passage between the primary circuit flow piping KV and the secondary circuit flow piping HV may be reduced by appropriately increasing the cross-section of the opening between the inner area 13 of the mixing chamber 10 and the secondary circuit flow piping inlet HV immediately before the fully opened position of the mixing device control means 11 represented by broken lines in FIG. 1 is reached. A corresponding increase in cross-section should preferably also be provided for the passage from the secondary circuit return piping HR to the primary circuit return piping KR.

The two-step control of the bypass control means 21 described hereinabove may be replaced by continuous control by a follower means 30 controlling the bypass control means actuator 22 continuously as a function of the position of the mixing device control means 11, said continuous control being designed for the bypass control means 21 to reach the limit position minimizing the bypass opening when the mixing device control means 11 reaches the position depicted in FIG. 1 by the broken lines. The transfer function of said follower device 30 may be a linear function, the distance by which the bypass control means 21 is moved being proportional to the angle by which the mixing device control means 11 is turned or may be any other transfer function, such as an exponential transfer function the distance by which the bypass control means 21 is moved increasing exponentially as mixing device control means 11 is moved towards the position represented in FIG. 1 by the broken lines. The linear transfer function referred to hereinabove may be implemented by gearing connecting shaft 12 moving the mixing device control means 11 and the bypass control means 21 incorporated in bypass 20, the gearing 30 acting directly on the bypass control means 21 eliminating the need for a separate actuator 22.

The non-linear transfer function referred to hereinabove may be implemented as a gearing-type follower means 30, using appropriate control curves. FIGS. 3A, 3B, 4A and 4C depict major elements of a gearing-type follower means 30 fit for four different control programmes adjusting the bypass control means 21' depicted in FIG. 2 in accordance with a non-linear transfer function to the position of shaft 12.

Figure 4A:
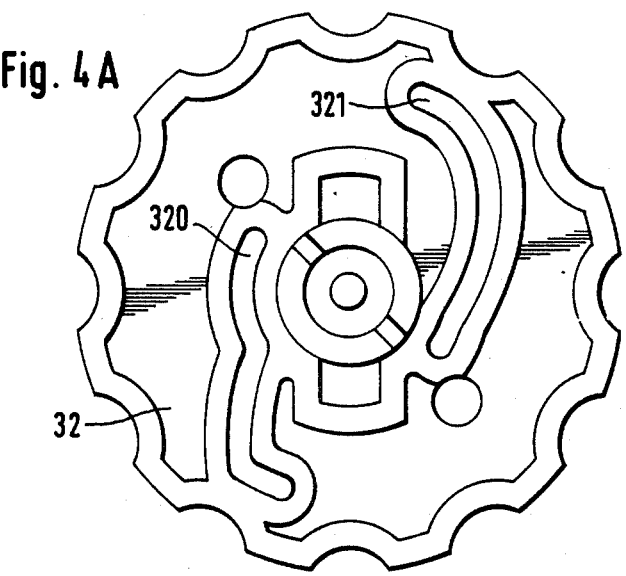
FIGS. 4A, 4B and 4C show a front view, a rear view and a side view of a disk-type controller according to another aspect of this invention fitted with four different control grooves guiding pins of said follower means for controlling said bypass butterfly valve in accordance with four different control programmes.
Figure 4B:
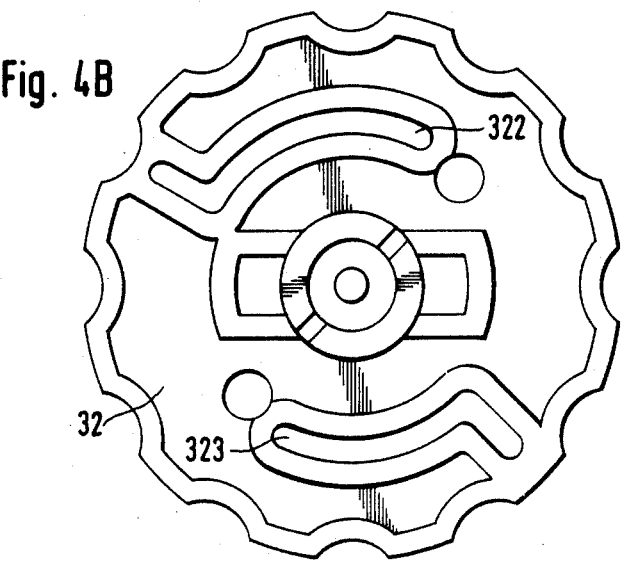
Figure 4C:
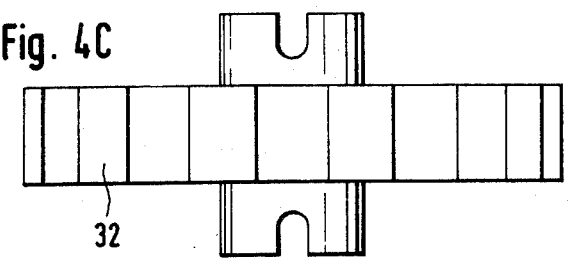

The follower means 31 depicted in FIGS. 3A ad 3B is fitted to the shaft of bypass control means 21' leaving housing 1 through the top, said follower means 31 being fitted with a pin 310 arranged at a certain distance from said shaft. Said pin 310 is controlled by a control disk 32 (FIGS. 4A, 4B and 4C) with four different grooves 320, 321, 322 and 323. FIG. 4A and FIG. 4B show two sides of control disk 32 with grooves 320 and 321 in one side and grooves 322 and 323 in the opposite side. Said control disk 32 is directly connected with the mixing device actuator shaft or the shaft 12 of the mixing device control means 11, the shaft of bypass valve 21' driven by control disk 32 and follower means 31 thereby following the movement of shaft 12 of the mixing device control means 11 in accordance with a (non-linear) programme implemented by groove 320, 321, 322 or 323 controlling pin 310.

An electric controller may be used in the place of follower means 30 to implement any desired transfer function.

FIGS. 5, 6 and 7 are schematic representations of another embodiment of the present invention providing for bypass 20' to be displaced axially in relation to mixing chamber 10.

In the embodiment of the present invention as depicted by FIGS. 6 and 7, the bypass control means 21" is a sector valve which may be moved about the axis of shaft 12 and fits tightly to the inner surface of the hollow cylinder shaped bypass housing 24. In the embodiment of the present invention depicted, the sector valve 21" is interlocked with the mixing device shaft 12 by means of a grooved-toothing ring 25, allowing to reset the position of the bypass control means 21" with respect to the position of the mixing device control means 11 at the time of the installation of the system which is the subject of the present invention. As shown by FIG. 7 and other figures, the bypass control means 21" keeps the opening 27 from bypass 20' to the secondary circuit flow piping HV more or less open until the mixing device control means 11 reaches the fully opened position represented by the broken lines in FIG. 1. When said position is reached and the passage from the primary circuit flow piping KV to the secondary circuit flow piping HV is fully opened, the bypass control means 21" closes opening 27 merely leaving, if desired, a small gap allowing no or little secondary circuit return water to enter the secondary circuit flow piping HV. The performance characteristics of the pump circulating the hot water through the heating system and the resistance of the mixing device may be adjusted appropriately by an appropriate design of opening 27 presetting the position of the bypass control means 21" with respect to the mixing device control means 11 and/or the selection of appropriate shapes of openings 14 in housing 10, such as, without limitation, the selection of an appropriate shape of the opening of the secondary circuit flow piping not visible in the figures. An opening 28 in the bypass housing 24 connects the secondary circuit return piping with the inner area of bypass housing 24.

FIG. 8 depicts a pot-shaped embodiment of bypass control means 21''' with openings 27' and 28' in a cylindrical side wall of said bypass control means 21''', the floor of said bypass control means 21''' being connected with the extended shaft of the mixing device control means 11 not shown by FIG. 8. The position of the bypass control means 21''' displaced axially with respect to the mixing chamber 10 is controlled proportionally to the position of the mixing device control means 11, changing the unobturated bypass cross-section via openings 27' and 28' such that the bypass cross-section is substantially closed or minimized when the mixing device control means 11 is fully opened. If openings 27' and 28' are designed appropriately, the return water flow through the bypass may be controlled appropriately over the entire control range of the mixing device.

It is to be understood that the invention is not limited to the embodiments described and shown but encompasses all modifications within the scope of the appended claims.

What I claim is:

1. In a hot water heating system comprising a primary circuit, a secondary circuit and a multi-way mixing device connected with the primary and secondary flow and return pipework for mixing primary circuit and secondary circuit water and fitted with control means for changing or adjusting the water flow rates in said primary and secondary circuits, a method of controlling the ratio between the water flow rate in the primary circuit and the water flow rate in the secondary circuit comprising the steps of:
   providing an adjustable bypass in communication with the secondary circuit return piping suitable for feeding an additional quantity of return water into the secondary circuit flow piping bypassing said mixing device;
   mixing said additional quantity of return water with the secondary circuit flow water passing through said mixing device; and
   controlling said bypass in response to the position of the mixing device control means and substantially closing said bypass when the way from the primary circuit flow piping through said mixing device to the secondary circuit flow piping is fully opened, thereby achieving good control characteristics over substantially the entire control range of said mixing device and fast control response.

2. A method according to claim 1 providing for the bypass control means to be continuously controlled in response to the mixing device control means.

3. A method according to claim 1 providing for the bypass control means to be moved to a limit position in response to the closed position of the mixing device or a different limit position in response to the opened position of the mixing device.

4. A system for controlling the ratio between the water flow rate in the primary circuit and the water flow rate in the secondary circuit of a hot water heating system, particularly a low-temperature hot water heating system, said control system comprising:
   a multi-way mixing device for mixing primary and secondary circuit water, said mixing system being connected with the primary and secondary circuit flow and return pipework and having a control means for changing the ratio between the water flow rates through said primary and secondary circuits;
   at least one adjustable bypass in communication with the secondary circuit return piping suitable for feeding an additional quantity of return water into the secondary circuit flow piping bypassing said mixing device said bypass being equipped with control means for changing the bypass cross-section; and
   a follower means activated at least one predetermined point of the mixing device control range to actuate the bypass control means for changing the bypass cross-section and to minimize said bypass cross-section when the way from the primary circuit flow piping through the mixing device to the secondary circuit flow piping is fully opened, said follower means being coupled to the mixing device control means.

5. A system according to claim 4 provided with a follower means fitted with a actuator controlling continuously a bypass control means as a function of the position of the mixing device control means.

6. A system according to claim 5, wherein said actuator is connected with a mixing device control means by way of gearing.

7. A system according to claim 6, wherein the mixing device control means is a swing-type butterfly valve in a cylindrical mixing chamber connected with a drive shaft, wherein a cylindrical bypass chamber with openings to the return piping and the secondary circuit flow piping is axially displaced with respect to said mixing chamber and wherein the bypass control means is a circular slide valve rigidly connected with said drive shaft so designed that the angle between the butterfly and the circular slide valve may be preset and adjusted.

8. A system according to claim 7, wherein the bypass control means or the mixing device control means is fitted to a sleeve firmly connected with and arranged coaxially to said drive shaft.

9. A system according to claim 8, wherein at least one frontal end of said sleeve is fitted with grooved toothing.

10. A system according to claim 7, wherein the inlet and outlet openings of the mixing device chamber and the bypass chamber are so adjusted that the internal resistance of said mixing device and said bypass are substantially constant over the entire control range of said mixing device.

11. A system according to claim 7, wherein the circular slide valve is embodied by a pot-shaped valve with a closed bottom wall and a cylindrical side wall with two openings, said openings and the adjacent bypass chamber openings representing orifices variable as a function of the position of the drive shaft referred to hereinabove.

12. A system according to claim 4, further comprising means for adjusting the limit position of the bypass control means for controlling the minimum bypass cross-section when the way through the mixing device is fully opened.

13. A system according to claim 4, wherein the bypass control means is an adjustable slide or butterfly valve for changing the bypass cross-section.

14. A system according to claim 6, wherein the control means for controlling the bypass cross-section is a bypass butterfly valve connected with a follower by means of a shaft and wherein said follower means is guided by means of a pin moving in a groove in a control disk coupled to the mixing device control means.

15. A system according to claim 4, wherein the follower means is fitted with a solenoid valve for actuating the bypass control means and control elements, said control elements being actuated by the mixing device control means energizing and de-energizing said solenoid valve.

16. A system according to claim 4, further comprising a body with four connections, one of said connections linking said body with the primary circuit flow piping, the second one linking said body with the primary circuit return piping, the third one linking said body with the secondary circuit flow piping and the fourth one linking said body with the secondary circuit return piping and further comprising a central cylindrical mixing chamber which may communicate with any of said four connections by way of appropriate openings, a butterfly valve which may rotate about the axis of said mixing chamber and whose position determines the ratio between the primary circuit water flow and the secondary circuit water flow and a bypass arranged radially outside said mixing chamber, said bypass being designed for connecting the secondary circuit flow and return pipings and having a cross-section adjusted by a control means controlled by the follower means referred to hereinabove.

17. An improved system for controlling the ratio between the water flow rate in the primary circuit and the water flow rate in the secondary circuit of a low-temperature heating system, comprising a primary circuit, a secondary circuit a multi-way mixing device connected with the primary and the secondary circuit flow and return pipings for mixing primary and secondary circuit water and equipped with a control means for changing the ratio between the primary circuit water flow rate and the secondary circuit water flow rate and an adjustable bypass communicating with the secondary circuit return piping suitable for feeding an additional quantity of return water into the secondary circuit flow piping bypassing said mixing device, said mixing device and said bypass being arranged in one body wherein a follower means is connected with the mixing device control means, said follower device being designed to actuate the bypass control means for changing the bypass cross-section so that said bypass cross-section will be minimized when the way from the primary circuit flow piping through said mixing device to the secondary flow piping is fully opened.

18. A system according to claim 17, further comprising means for changing the limit position of the bypass control means reached when the way from the primary circuit flow piping through the mixing device to the secondary flow piping is fully opened, thereby changing the minimum bypass cross-section.

19. A system according to claim 18, wherein the bypass control means is an adjustable slide or butterfly valve for changing the bypass cross-section.

20. A system according to claim 19, wherein the control means for controlling the bypass cross-section is a bypass butterfly valve connected with a follower by means of a shaft and wherein said follower means is guided by means of a pin moving in a groove in a control disk coupled to the mixing device control means.

21. A system according to claim 18, wherein the follower means is fitted with a solenoid valve for actuating the bypass control means and control elements, said control elements being actuated by the mixing device control means energizing and de-energizing said solenoid valve.

* * * * *